United States Patent [19]

Repko

[11] Patent Number: 5,432,724

[45] Date of Patent: Jul. 11, 1995

[54] PROCESSOR FOR UNIFORM OPERATIONS ON RESPECTIVE SERIES OF SUCCESSIVE DATA IN RESPECTIVE PARALLEL DATA STREAMS

[75] Inventor: Willem L. Repko, Nijmegen, Netherlands

[73] Assignee: U.S. Philips Corporation, New York, N.Y.

[21] Appl. No.: 161,950

[22] Filed: Dec. 2, 1993

[30] Foreign Application Priority Data

Dec. 4, 1992 [EP] European Pat. Off. ............ 92203765

[51] Int. Cl.6 ............................................. G06F 15/31
[52] U.S. Cl. .......................... 364/724.16; 364/724.13; 364/724.19; 364/750; 364/DIG. 1; 395/425; 395/725
[58] Field of Search .............. 364/736, 724.16, 724.13, 364/724.19; 395/DIG. 1, DIG. 2, 425

[56] References Cited

U.S. PATENT DOCUMENTS

| | | | |
|---|---|---|---|
| 3,997,771 | 12/1976 | Perlowski et al. | 235/156 |
| 4,490,807 | 12/1984 | Chevillat et al. | 364/736 |
| 4,594,655 | 6/1986 | Hao et al. | 364/200 |
| 4,604,695 | 8/1986 | Widen et al. | 364/200 |
| 4,692,888 | 9/1987 | New | 364/728 |
| 4,799,149 | 1/1989 | Wolf | 364/200 |
| 4,852,098 | 7/1989 | Brechard et al. | 371/37 |
| 4,931,973 | 6/1990 | Asghar et al. | 364/724.16 |
| 4,942,608 | 7/1990 | Shigehara | 381/43 |
| 5,010,509 | 4/1991 | Cox et al. | 364/748 |
| 5,091,851 | 2/1992 | Shelton et al. | 395/425 |
| 5,121,502 | 6/1992 | Rau et al. | 395/8 |
| 5,155,824 | 10/1992 | Edenfield et al. | 395/425 |
| 5,177,698 | 1/1993 | Parulski | 364/723 |
| 5,204,828 | 4/1993 | Kohn | 364/736 |
| 5,249,146 | 9/1993 | Uramoto et al. | 364/725 |
| 5,282,155 | 1/1994 | Jones | 364/724.19 |

OTHER PUBLICATIONS

Philips IC TDA 1307.

Primary Examiner—Kevin A. Kriess
Assistant Examiner—L. Toplu
Attorney, Agent, or Firm—Edward W. Goodman

[57] ABSTRACT

A data processing system for processing parallel first and second sequences of successive first and successive second data, respectively, includes a memory, having a memory input to receive the first and second data for storage; and an operating circuit coupled to a memory output of the memory to receive a predetermined number of selected ones of the stored first data or the predetermined number of selected ones of the stored second data supplied by the memory, and for operating thereon. The memory is operative to store the first and second data provided in parallel at the memory input as first and second fields of a single word, each word being retrievable upon a single access. The system includes a rearrangement circuit, connected between the memory output and the operating circuit for receiving particular words and for alternately and in parallel providing the predetermined number of successive first data and the predetermined number of successive second data to the operating circuit. The system is typically useful as stereo audio equipment.

4 Claims, 2 Drawing Sheets

PROCESSOR FOR UNIFORM OPERATIONS ON RESPECTIVE SERIES OF SUCCESSIVE DATA IN RESPECTIVE PARALLEL DATA STREAMS

BACKGROUND OF THE INVENTION

1. Field of the Invention

The invention relates to a data processing system for processing parallel first and second sequences of successive first and successive second data, respectively. The system comprises a memory means, having a memory input to receive the first and second data for storage; and an operating means coupled to a memory output of the memory means to receive a predetermined number of selected ones of the stored first data or the predetermined number of selected ones of the stored second data supplied by the memory means, and for operating thereon.

2. Background Art

Such a system is known from Philips' IC TDA 1307, for use in a stereo audio processing circuit. The operating means of the known IC includes a transversal filtering means to filter audio samples from both a right hand side channel and a left hand side channel. Filtering is performed by way of a transversal filter. That is, respective successive samples are multiplied by respective coefficients and thereupon summed to implement a convolution. The filter function typically is a symmetric function, e.g., $sync(y) = sin(y)/y$.

Since the used filter function is evenly symmetrical, samples to be filtered preferably are functionally grouped into pairs, each respective pair being associated with a respective single one of the filter coefficients. Accordingly, by first forming the sum for each such pair and thereupon multiplying the sum by the associated coefficient, a multiplication is saved for each such pair. Note that the same approach holds true for an odd filter function.

In order to perform the summing operation, it is required that in each cycle the two samples constituting such a pair, either originating from the left hand side channel or from the right hand side channel, are made available simultaneously. This could be achieved by using a single multiport-RAM in order to store the samples and to thereupon provide the required samples in parallel. This architecture, however, would represent a relatively expensive solution. As an economic alternative, the prior art employs two physically separated RAMs, one for storing the most recent half of the successive samples, both right hand side and left hand side, to be multiplied by the associated filter coefficients and another one for storing the earlier half of the successive samples to be multiplied by the same coefficients.

Although the known architecture functions perfectly well, it entails some less advantageous features. First, the use of two separate RAMs requires a relatively larger substrate area than the use of a single RAM, owing to, among other things, the duplication of memory control circuitry, and of signal and power supply leads. Second, additional circuitry is needed to repetitively transfer the recent samples, stored in the recent-sample-RAM, to the earlier-sample-RAM when they have attained the status of "earlier samples". This not only gives rise to additional substrate area and additional power consumption, but also needs extra cycles during which the filtering operation itself is to be put on hold or idles. Third, the processing of samples is performed in repetitive cycles, the order of handling right hand side samples and left hand side samples being distributed non-uniformly during each cycle. As a result, retrieval control is somewhat complicated.

SUMMARY OF THE INVENTION

It is therefore an object of the invention to provide a data processing system as introduced in the preamble above that permits a smaller and simpler implementation that is more time efficient as idling is reduced.

To achieve this goal, the invention provides a data processing system for processing parallel first and second sequences of successive first and successive second data, respectively. The system comprises a memory means, having a memory input to receive the first and second data for storage; and an operating means coupled to a memory output of the memory means to receive a predetermined number of selected ones of the stored first data or the predetermined number of selected ones of the stored second data supplied by the memory means, and for operating thereon. According to the invention, the memory means is operative to store the first and second data, which are provided in parallel at the memory input, as first and second fields of a single word, each word being retrievable upon a single access. In addition, the system comprises a re-arrangement means, connected between the memory output and the operating means, for receiving particular words and for alternately and in parallel providing the predetermined number of successive first data and the predetermined number of successive second data to the operating means.

The invention is based on the insight that the data (or signal samples) provided in each of the sequences undergo substantially uniform operations. By using a memory operative to store a first data and a second data, which were supplied in parallel to the memory input, together as fields of a single word and re-arranging the order of sample handling upon retrieval, one single memory suffices. Consequently, the system of the invention needs less peripheral circuitry than the prior art, needs fewer memory accesses than in the prior art as data transfers among memories are absent, functions under control of a reduced instruction set, and has simplified memory control.

In a preferred embodiment of the invention, the operating means includes a dyadic operator means operative to apply dyadic operator, and the predetermined number equals two. This embodiment is typically useful as stereo audio equipment, wherein one channel supplies the data for the left hand side and the other channel for the fight hand side speakers.

Preferably, the re-arrangement means comprises a module having: first and second data inputs connected to the memory output to receive the particular word; a first multiplexer with a first multiplexer input connected to the first data input; a first register with a register input connected to the second data input, and with a first register output connected to a second multiplexer input of the first multiplexer; a second multiplexer having a first multiplexer input connected to the first register output and having a second multiplexer input connected to the first data input, and having a second multiplexer output to the dyadic operator means; and a second register having a second register input connected to an output of the first multiplexer, and having a second register output connected to the dyadic operator means.

This embodiment merges functionalities of its components since it uses its registers and multiplexers for both the first and the second fields.

BRIEF DESCRIPTION OF THE DRAWINGS

The invention is explained by way of example and with reference to the accompanying drawings, wherein.

DETAILED DESCRIPTION OF THE EMBODIMENTS

First Block Diagram

Figure 1:
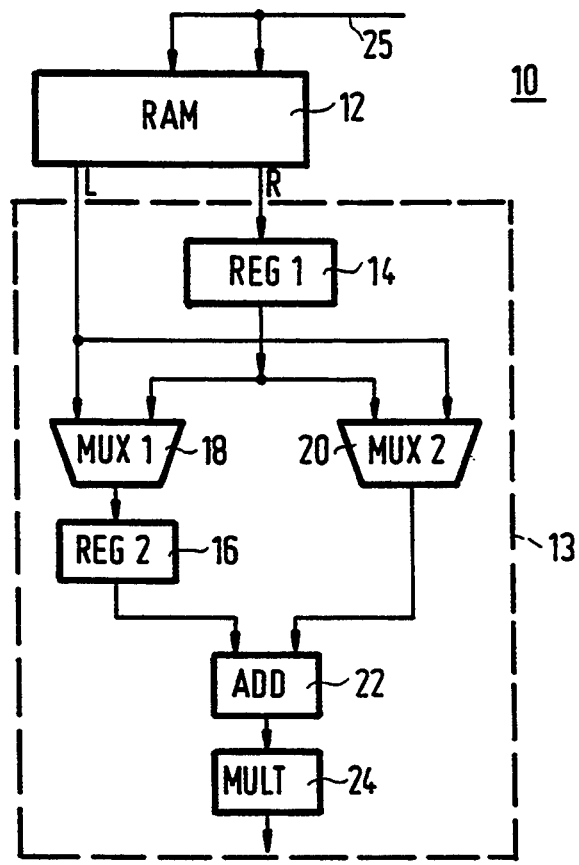
FIG. 1 illustrates a first block diagram of the system in the invention.

FIG. 1 illustrates a data processing system 10 in the invention. System 10 operates synchronously, that is, under clock signal control. System 10 includes a memory 12, e.g., a RAM, and a module 13. Module 13 includes first and second registers 14 and 16, first and second multiplexers 18 and 20, an adder 22 and a multiplier 24. Memory 12 is operative to store at each respective one of a plurality of addresses both a respective sample L and a respective sample R, received in parallel via a bus 25.

Memory 12 supplies samples L to either adder 22 via second multiplexer 20 or to second register 16 via first multiplexer 18. Memory 12 supplies samples R to register 14. Register 14 furnishes samples R to either second register 16 via first multiplexer 18 or adder 22 via second multiplexer 20.

During a first clock cycle T1, memory 12 is accessed to provide a sample pair, L1 and R1. Sample L1 is supplied to second register 16 via first multiplexer 18, and sample R1 is supplied to first register 14. At the end of the first cycle, second register 16 stores sample L1, whereas first register 14 stores sample R1.

During a next, second clock cycle following operations are performed. Sample L1 stored in second register 16 is supplied to adder 22, and sample R1 in first register 14 is routed to second register 16 via first multiplexer 18. Memory 12 is accessed to supply a second pair of samples L2 and R2. Sample L2 is transferred via second multiplexer 20 to adder 22, and sample R2 is stored in first register 14. Adder 22 then provides L1+L2 at its output.

During a next, third clock cycle, following operations take place. The sum (L1+L2) is multiplied by a particular coefficient in multiplier 24. Sample R1 stored in second register 16 is supplied to adder 22, and sample R2 in first register 14 is routed to adder 22 via second multiplexer 20. Adder 22 then provides R1+R2 at its output. Memory 12 is accessed to supply a third pair of samples L3 and R3. Sample L3 is supplied to second register 16 via first multiplexer 18, and sample R3 is supplied to first register 14. At the end of the third cycle, second register 16 stores sample L3, whereas first register 14 stores sample R3.

During the next, fourth cycle, multiplier 24 multiplies (R1+R2) by a specified coefficient. Further operations in the fourth and further cycles are similar to those as mentioned above, mutatis mutandis with regard to the further individual samples.

The effect is that in a series of successive clock cycles scaled sums of two L samples and scaled sums of two R samples are produced alternately, i.e., each clock cycle effectively stands for one addition and one multiplication. Pipelining may be used to distribute single operations among several clock cycles, without affecting the result of one addition and one multiplication effectively per clock cycle.

Second Example

Figure 2:
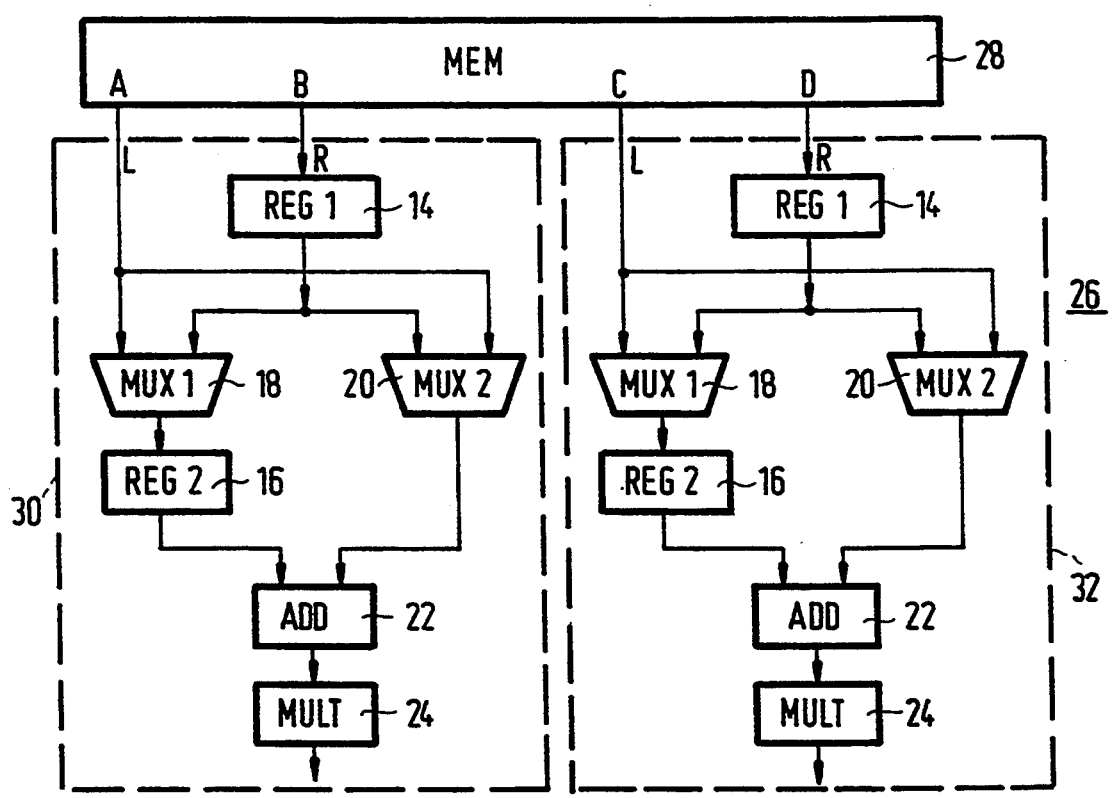
FIG. 2 gives a second block diagram of a system in the invention.

FIG. 2 illustrates that above strategy is easily extended to a system 26 handling any even number 2N of samples stored at the same address of a memory 28. In the example shown in FIG. 2, N equals 2. The samples are then to be supplied in N pairs to N modules (30, 32) arranged in parallel, each such module including first and second registers 14 and 16, first and second multiplexers 18 and 20, an adder 22 and a multiplier 24. For example, memory 12 stores at each single address four samples A, B, C and D. Then two structures, each containing first and second registers 14 and 16, first and second multiplexers 18 and 20, an adder 22 and a multiplier 24 are connected to memory 12. In a series of successive clock cycles scaled sums of two A samples and scaled sums of two C samples are produced simultaneously during even numbered clock cycles, and scaled sums of two B samples and scaled sums of two D samples are produced during odd numbered clock cycles.

Third Example

Figure 3:
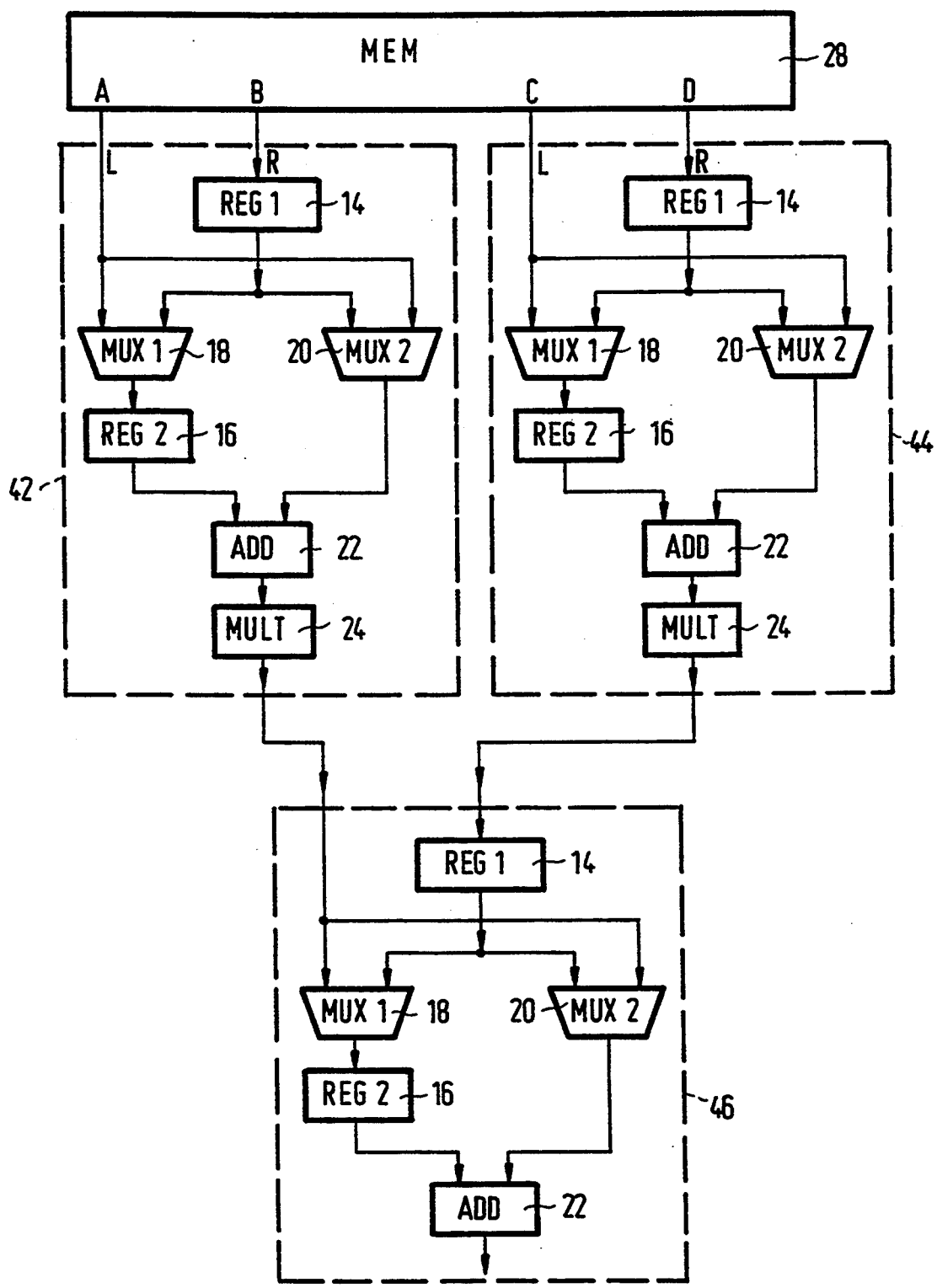
FIG. 3 shows a third block diagram of a system in the invention.

FIG. 3 shows an example of the system 40 in the invention, including a layered arrangement of modules 42, 44 and 46 to process successively supplied multiples of samples A, B, C and D that are provided in parallel. Each of modules 42, 44 and 46 includes first and second registers 14 and 16, first and second multiplexers 18 and 20, and an adder 22. Modules 42 and 44 each include a multiplier 24 and are arranged in parallel to receive pairs of A and B samples and pairs of C and D samples, respectively. As explained above, module 42 then alternately provides at an output of its adder 22 sums of two successive A samples and sums of successive B samples. Likewise, module 44 alternately provides at an output of its adder 22 sums of two successive C samples and sums of successive D samples. Modules 42 and 44 provide their results in parallel to module 46. Module 46 supplies at an output of its adder 22 sums of two successive samples provided by module 42, i.e., $\alpha(A1+A2)+\alpha(B1+B2)$ and sums of two successive samples furnished by module 44, i.e., $\beta(C1+C2)+\beta(D1+D2)$, wherein the factors $\alpha$ and $\beta$ are delivered via multipliers 24 of modules 42 and 44, respectively. Note the modular architecture.

In other applications, adder 22 may be replaced by a device performing another dyadic operator, e.g., a multiplication of the operands received via register 16 and multiplexer 20; and that multiplier 24 may be replaced by a further device to operate on the outcome of the device preceding it in the signal path, e.g., a division by two.

The architecture presented in FIGS. 2 and 3 may be employed, for instance, in image processing using signal samples arranged in rows and columns of a rectangular window. Rows of samples can then be supplied in parallel to memory 28 for being stored word-wise according to the invention. Each single word is composed of a concatenation of simultaneously available row samples. Filtering, weighting or another linear operation then is performed in the row direction. Columns of the samples can similarly be treated to execute operations in the column direction.

Other applications of the invention may relate to general parallel data processing, wherein each one of parallel streams of data undergoes an operation involving successive data of the same stream.

What is claimed is:

1. A data processing system for processing parallel first and second sequences of successive first and successive second data, respectively, the system comprising:
   a memory means, having a memory input to receive the first and second data for storage; and
   operating means coupled to a memory output of the memory means to receive a predetermined number of selected ones of the stored first data or the predetermined number of selected ones of the stored second data supplied by the memory means, and for operating thereon;
characterized in that the data processing system further comprises:
   means for controlling the memory means to store the first and second data provided in parallel at the memory input as first and second fields of a single word, and to supply each word upon a single access; and
   a re-arrangement means, connected between the memory output and the operating means, for receiving particular words and for alternately supplying the predetermined number of successive first data and the predetermined number of successive second data in parallel to the operating means.

2. The system of claim 1, wherein the predetermined number equals two, and wherein the operating means includes a dyadic operator means operative to apply a dyadic operator.

3. The system of claim 1, wherein the re-arrangement means comprises a module having:
   first and second data inputs connected to the memory output to receive the first and second fields of the particular word;
   a first multiplexer with a first multiplexer input connected to the first data input;
   a first register with a register input connected to the second data input, and with a first register output connected to a second multiplexer input of the first multiplexer;
   a second multiplexer having a first multiplexer input connected to the first register output and having a second multiplexer input connected to the first data input, and having a second multiplexer output to the operating means;
   a second register having a second register input connected to an output of the first multiplexer, and having a second register output connected to the operating means.

4. The system of claim 2, wherein the re-arrangement means comprises a module having:
   first and second data inputs connected to the memory output to receive the first and second fields of the particular word;
   a first multiplexer with a first multiplexer input connected to the first data input;
   a first register with a register input connected to the second data input, and with a first register output connected to a second multiplexer input of the first multiplexer;
   a second multiplexer having a first multiplexer input connected to the first register output and having a second multiplexer input connected to the first data input, and having a second multiplexer output to the operating means;
   a second register having a second register input connected to an output of the first multiplexer, and having a second register output connected to the operating means.

* * * * *